United States Patent [19]

Bukhshtab et al.

[11] Patent Number: 5,037,197

[45] Date of Patent: Aug. 6, 1991

[54] METHOD OF DETERMINING OPTICAL LOSSES AT THE ENDS AND END JOINTS OF FIBER LIGHT GUIDES

[76] Inventors: Mikhail A. Bukhshtab, ulitsa Novoselov, 41,kv.21; Vladislav N. Koromyslichenko, ulitsa Dekabristov,58,kv.23; Andrei A. Ovsyannikov, ulitsa Chudnovskogo,8,ky.70, all of Leningrad, U.S.S.R.

[21] Appl. No.: 472,556

[22] Filed: Jan. 31, 1990

[51] Int. Cl.$^5$ .................. G01N 21/84; G01N 21/49
[52] U.S. Cl. .................................. 356/73.1
[58] Field of Search ................................ 356/73.1

[56] References Cited

FOREIGN PATENT DOCUMENTS 60-35237 2/1985 Japan .................. 356/73.1

Primary Examiner—Vincent P. McGraw
Attorney, Agent, or Firm—Fleit, Jacobson, Cohn, Price, Holman & Stern

[57] ABSTRACT

The aim of the invention, improving the resolution by increasing the maximum possible distance to the test joint and expanding the range of applications by allowing the finish quality of the ends, and their parallel and coaxial alignment to be determined, is achieved by successively sending probing light pulses into the light guides being joined, measuring the total power of reflection from the ends and end joints, and determining optical losses in these portions from mathematical formulae.

2 Claims, 2 Drawing Sheets

METHOD OF DETERMINING OPTICAL LOSSES AT THE ENDS AND END JOINTS OF FIBER LIGHT GUIDES

FIELD OF THE INVENTION

The present invention relates to fiber optics and can be used for determining the extent of radiation attenuation at the joints of light guides devoid of air gaps in municipal and trunk communication networks built on the basis of fiber light guides.

INDUSTRIAL APPLICABILITY

The present invention can be used during assembly, repairs, and maintenance of trunk networks of optical fiber light guides, and also in studying various kinds of joints between fiber light guides.

BACKGROUND OF THE INVENTION

Known in the art is a method of measuring optical losses in fiber light guides in reflected light (ref. USSR Application No. 4204727, with a decision to issue an Inventor's Certificate passed on May 30, 1988), comprising a probing radiation pulse into a test light guide through a blank light guide, the length of which is equal to half the length of the established mode distribution for the given type of light guide, measuring the energy $N_1$ of a pulse reflected from the output end of the blank light guide, measuring the energy $N_2$ of a pulse reflected from the output end of the blank light guide and the input end of the test light guide located at a minimum distance from each other, measuring the energy $N_3$ of a pulse reflected from the output end of the test light guide and determining optical losses $\mu$ per unit length of the test light guide.

This prior art method is disadvantageous in that it cannot be used for determining optical losses at the radiation input and output of the test light guide, i.e., at the output end of the blank light guide and at the input and output ends of the test light guides, and also in the air gap between the joined light guides because of the non-parallel alignment of their ends and the non-coaxial alignment of their cores.

Also known in the art is a method of determining optical losses in joints of light guides according to scattered radiation propagating in the backward direction (ref. Shiketants, D., "Theory of Measurement by Backward Scattering Method in Light Guides" in Zarubezhnaya Radioelektronika, 1981, No. 6, pp.87-94), comprising sending radiation into the light guides being joined, measuring the intensity of radiation scattered in the light guides upstream and downstream of the joint, and determining optical losses in the joint of the light guides.

As the closest prior art of the present method in technical essence, this method has been selected as the prototype.

A drawback of the prior art method is the low intensity of the scattered radiation, which limits the maximum possible distance in the light guide line to the test joint.

The need exists, however, and its importance rises with an increase in the length of trunk light guide communication cables the length of which presently reaches 30 to 40 kilometers or more, and which are accessed by measuring devices from one side only.

SUMMARY OF THE INVENTION

The present invention is aimed at expanding the range of applications by determining the finishing quality of the end faces, and their parallel and coaxial alignment.

Another aim of the invention is to improve the resolution by increasing the maximum possible distance to the test joint, as a result of which the dynamic range of measurements is expanded.

The first of these aims is achieved by that a prior art method comprising successively sending a probing radiation pulse into the fiber light guides being joined and then determining optical losses at their joint according to the radiation propagating in the backward direction, further comprises measuring the energy or total power $N_1$ of pulses reflected from the output end of the first test light guide, determining losses $K_1 = 10\log(N_{1max}/N_1)$ at the output end of the first light guide from the difference between the value of $N_1$ and the maximum $N_{1max}$, measuring the energy or total power $N_2$ of pulses reflected from the ends of the first and second light guides interconnected at a measured air gap, determining losses $K_2 = 10\log(N_{2max}/N_2) - K_1$ at the input end of the second light guide from the difference between the values of $N_2$ and $N_{2max}$ and $N_1$ and $N_{1max}$, determining losses $K_{//} = 10\log[(N_2/N_1)_{max}/(N_2/N_1)]$ due to non-parallel alignment of the joined ends from the difference between the ratio $N_2/N_1$ and the maximum $$\left(\frac{N_2}{N_1}\right)_{max} = \frac{(n+1)^2}{n^2+1},$$

measuring the energy or total power $N_{3i}$ of pulses which have passed through the test joint and have been reflected from the ideally finished output end of the second light guide, determining the losses $K_n = 10\log(N_{3max}/N_{3i})$ due to non-coaxial alignment of the joint from the difference between the value of $N_{3i}$ and the maximum level, measuring the energy or total power $N_3$ of pulses reflected from the output end of the second test light guide, determining the losses $K_3 = 10\log(N_{3i}/_{3i})$ at the output end of the second light guide from the difference between the values of $N_3$ and $N_{3i}$, evaluating the total losses $K_{\Sigma s}$ in the test joint of the light guides from the formula:

$$K_{\Sigma s} = K_{//} + K_n,$$

and evaluating the total losses $K_{\Sigma T}$ at all the three ends of the light guides from the formula:

$$K_{\Sigma T} = K_1 + K_2 + K_3.$$

To attain the second aim of the invention, the method provides for measuring the energy or power $N_1'$ of a pulse which has passed through the ends of the light guides joined at a minimum air gap, has been reflected from the output end of the second light guide, and returned to the input end of the first light guide, connecting the first and second light guides, measuring the energy or power $N_2'$ of a pulse which has passed through the joint and been reflected from the output end of the resulting integral light guide, and determining the optical losses K at the joint from the formula:

$$K[dB] = 10\log 2n - 10\log(n^2+1) + 5\log N_2' - 5\log N_1' \qquad (1)$$

wherein n is the group refraction index of the cores of the light guides being joined.

The claimed combination of features has not been used anywhere previously and, therefore, meets the world novelty inventive criterion.

The method of determining losses depending on the finishing quality of the ends comprises the following sequence of interrelated steps:
1. Radiation pulses (pulse) are sent into the first test light guide;
2. The energy (total power) $N_{1max}$ of pulses reflected from the ideally finished output end of said light guide and propagating in the backward direction is measured;
3. The ideally finished input end of the second test light guide is attached to the output end of the first light guide parallel thereto and at a minimum air gap therebetween;
4. The energy (total power) $N_{2max}$ of pulses reflected from the ideally joined ends is measured;
5. Light pulses are sent into the second test light guide ideally coaxial with the first light guide;
6. The energy (total power) $N_{3max}$ of pulses reflected from the ideally finished output end of the second light guide is measured;
7. The output end of the first test light guide is treated;
8. The energy (total power) $N_1$ of pulses reflected from the realistically finished output end of the first light guide is measured;
9. The losses $K_1 = 10\log(N_{1max}/N_1)$ at the output end of the first light guide are determined;
10. The realistically finished end of the second light guide is attached at a realistic air gap to the output end of the first light guide;
11. The energy (total power) $N_2$ of pulses reflected from the ends of the first and second light guides connected at a test air gap is measured;
12. Optical losses $K_2 = 10\log(N_{2max}/N_2) - K_1$ at the input end of the second light guide and losses $K_{//} = 10\log[(N_2/N_1)_{max}/(N_2/N_1)]$ due to non-parallel alignment of the joined ends are determined;
13. The first and the second test light guides are joined in a realistic coaxial alignment;
14. The energy (total power) $N_{3i}$ of pulses which have twice passed through the test joint and have been reflected from the ideally finished output end of the second light guide is measured;
15. Optical losses $K_n = 10\log(N_{3max}/N_{3i})$ due to non-coaxial alignment of the test joint are determined;
16. The output end of the second test light guide is treated
17. The energy (total power) $N_3$ of pulses reflected from the realistically finished output end of the second light guide is measured;
18. Optical losses $K_3 = 10\log(N_{3i}/(N_3)$ at the output end of the second test light guide are determined, and
19. The total optical losses $K_{\Sigma s}$ in the measured joint are evaluated from the formula $K_{\Sigma s} = K_{//} + K_n$, and the total losses $K_{\Sigma T}$ at all the three test joints are found from the formula:

$$K_{\Sigma T} = K_1 + K_2 K_3.$$

The method of determining optical losses at the end joints of the light guides for a maximum possible distance to the test end comprises the following sequence of interrelated steps:
1. Sending a probing light pulse into the light guides being joined;
2. Measuring the energy or power $N_1'$ of a pulse which has passed through the ends of the light guides joined at a minimum air gap and prepared for subsequent connection, has been reflected from the output end of the second light guide and returned to the input end of the first light guide along the previous path;
3. Connecting the first and second light guides;
4. Measuring the energy or power $N_2'$ of a pulse which has passed through the joint along the previous path and has been reflected from the output end of the resulting integral light guide, and
5. Determining optical losses K at the joint from the formula:

$$K[dB] = 10\log 2n - 10\log(n^2+1) + 5\log N_2' - 5\log N_1'.$$

An advantage of the present measurement method is that owing to the closer relation between the amount of reflected radiation and the condition of the end faces of the light guides and the extra pure quartz glass from which they are drawn compared to the radiation passing through the same ends, as well as on account of the reflection from the ends being several orders higher in comparison with the radiation scattered by the light guides, the sensitivity of measurements in the reflected light to the condition of the end faces, their parallel alignment, optical losses in the air gap between the ends, and the coaxial relation between the fiber light guides, which determines mode mismatch losses, is considerably greater than the sensitivity to similar losses in passing radiation or radiation scattered by the light guides, and also that measurements are made in the light reflected from the equivalent ends of the light guides, rather that in the light scattered by the different portions of the light guides being joined, the intensity of reflected light being several orders higher than that of the scattered light, as a result of which the dynamic range of measurements and, therefore, the distance to the test joint of the light guides can be increased a corresponding number of times.

BRIEF DESCRIPTION OF THE DRAWINGS

The invention is illustrated in the accompanying drawings, wherein.

Figure 1A:
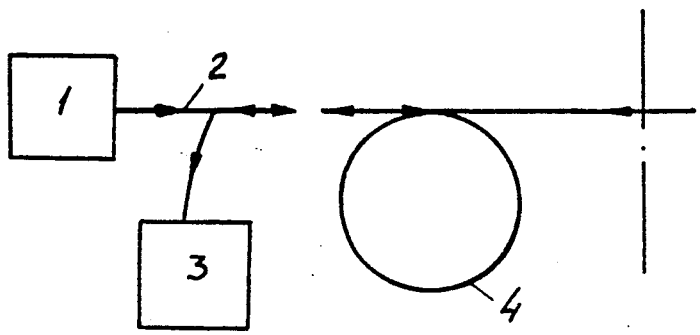
FIG. 1 shows a device for performing the method of measuring losses depending on the finish quality of the end faces of the fiber light guides.
Figure 1B:
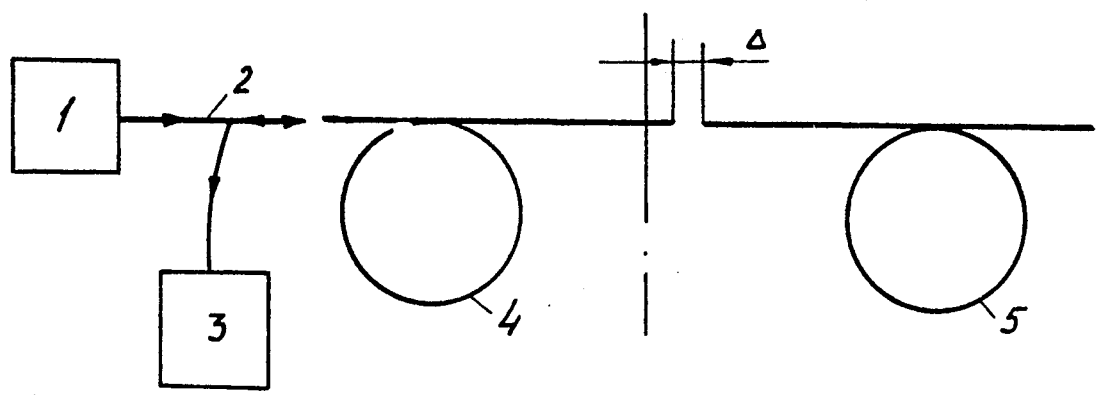
Figure 1C:
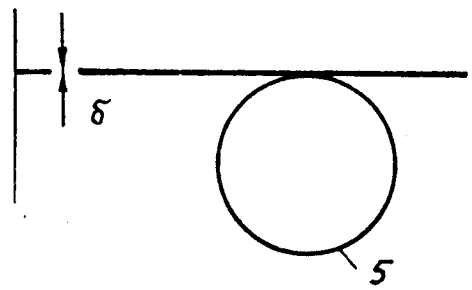

The device comprises a radiation source 1, a splitter 2 for incident and reflected radiation, a reflected pulse receiver 3, a first light guide 4 and a second light guide 5 to be joined to the first light guide.

DESCRIPTION OF THE PREFERRED EMBODIMENT

The method is performed as follows: A radiation pulse from the source 1 is sent through the splitter 2 into the first light guide 4 and the radiation reflected from its output end reaches through the same splitter 2 the reflected light receiver 3 (view a). A signal $N_1$ separated by corresponding time sampling and caused by the pulse reflected from the output end is equal to $$N_1 = const \cdot \tau_{1,2}(1 - \rho)exp(-\mu_4 l_4)\rho exp(-\mu_4 l_4)(1 - \rho)\rho_{2,3} = \quad (2)$$

$$const \cdot \tau_{1,2} \cdot \tau_{2,3}(1 - \rho)^2 exp(-2\mu_4 l_4)\rho,$$

wherein the factor const characterizes the spectral response of the receiver 3 and the radiation flux of the source 1, $\tau_{1,2}$ and $\tau_{2,3}$ are transmission factors of the splitter 2 during propagation of light from the source 1 to the receiver 2, $(1-\rho)$ is the transmission factor of the input end of the light guide 4, $\rho$ is the reflection factor of the output end, and $\mu_4$ and $l_4$ are a radiation attenuation factor and the length of the light guide 4.

Two factors in the formula (2) characterize the condition of the end surfaces of the light guide: $(1-\rho)$ is the input surface and $\rho$ is the output surface.

The relative changes in the signal $\Delta N_1/N_1$ following from the formula (2) are equal (only in the function of changes of said two factors).

$$\frac{\Delta N_1}{N_1} = \pm \left( \frac{2\Delta\rho}{1-\rho} + \frac{\Delta\rho}{\rho} \right)$$

Since in the case of optical (quartz) glass from which the light guides are drawn, it may be assumed that $\rho \cong 0.035$ and accordingly $1-\rho \cong 0.965$, changes in $\rho$ at the input end and in $\rho$ at the output end by $\pm 10\%$ will result in changes $2\Delta\rho(1-\rho) = \pm 2 \times 0.0035/(1-0.035-0.0035) = \pm 0.007$-/0.9615 $= \pm 0.0073 = \pm 0.7\%$ and in changes $$\Delta\rho/\rho = \pm \frac{0.0035}{0.035} = \pm 0.1 = \pm 10\%.$$

In other words, as a result of the same changes in the optical condition of the input and output surfaces changes $\Delta N_1/N_1$ in the signal reflected from the output end of the light guide being joined are 13 times, i.e., more than an order, more sensitive to the condition of the output end than to the condition of the input end. Similarly, it may be demonstrated that during studies in scattered light propagating in a backward path through the test joint surface, changes in the condition of the surface are also equal to $2\Delta\rho/(1-\rho)$, rather than $\Delta\rho/\rho$.

Therefore, measurement of the energy (power) $N_1$ for different shear surfaces of the output end of the light guide 4 and determination of the ratio of $N_1$ to the maximum value of $N_{1max}$ attained on an ideal shear surface, which can be checked visually, with the help of microscope, make it possible to evaluate most truthfully, at the greatest sensitivity to existing defects, the finish quality of the output end of the first light guide of the joint. The losses $K_1$ at this end are, in decibels:

$$K_1 = 10 log(N_{1max}/N_1).$$

Next, the input end of the second light guide 5 is treated and affixed to the output end of the first light guide 4 (view b) at a corresponding air gap, which appears optimal to the observer. The same receiver 3 measures the energy or total power $N_2$ of pulses reflected from the realistically joined ends of the light guides 4 and 5.

$$N_2 = const \cdot \tau_{1,2}\tau_{2,3}(1 - \rho)^2 exp(-2\mu_4 l_4) [\rho + (1 - \rho)^2\rho + \quad (3)$$

$$(1 - \rho^2)\rho^3 \ldots = const \cdot$$

$$\tau_{1,2}\tau_{2,3}(1 - \rho)^2 exp(-2\mu_4 l_4)\rho \left( 1 + \frac{1-\rho}{1+\rho} \right) =$$

$$const \cdot \tau_{1,2}\tau_{2,3}(1 - \rho)^2 exp(-2\mu_4 l_4) \frac{2\rho}{1+\rho}$$

It is to be seen from formula (3) that changes in the optical condition of the joined end surfaces have twice as high an effect on changes in the signal $N_2$: $N_2/N_2$ because of the factor $\pm 2\Delta\rho/\rho$. Therefore, the low quality of the shear surface, the non-parallel alignment of the end faces and the additional optical losses in them have a maximum effect on changes in the signal $\Delta N_2/N_2$ recorded by the receiver 3.

As a result, the ratio of $N_2$ to $N_{2max}$, corresponding to the ideal condition of the end faces and their parallel alignment at a minimum air gap that does not disturb the radiation mode distribution in the light guides, characterizes the total radiation losses in the air gap produced by the joint. Therefore, with the losses $K_1$ at the first end known from the formula (2), the losses $K_2$ contributed to the joint by the second end, i.e., the input end of the light guide 5, are determined:

$$K_2 = 10log(N_{2max}/N_2) - 10log(N_{1max}/N_1) - 10log(N_{2max}/N_2) - K_1$$

In order to isolate the losses due to non-parallel alignment of the ends of the light guides being joined out of the total losses in the air gap, use is made of the following formula:

$$\frac{N_2}{N_1} = \frac{2}{1+\rho} \quad (4)$$

the maximum value of which, given the ideal condition of the end faces and their parallel alignment, and in the absence of additional losses, is equal to:

$$\left( \frac{N_2}{N_1} \right)_{max} = \frac{2}{1 + \left( \frac{n-1}{n+1} \right)^2} = \frac{(n+1)^2}{n^2+1} \quad (5)$$

wherein n is the group refraction index of the light guide cores. Therefore, the difference between the formula (4) and formula (5) determines optical losses in the joint due to the low finishing quality of the end faces (in particular, the input end of the second light guide, since the condition of the output end of the first light guide is already determined), the non-parallel alignment of the surfaces, and the total optical losses in the air gap. Losses caused by non-parallel alignment of the joined ends expressed in decibels are: $K_{//} = 10log[(N_2/N_1)_{max}/(N_2/N_1)]$.

In all the above-mentioned losses of the useful signal in the resulting joint of the light guides, no account was taken of the losses due to the non-coaxial alignment of the cores of the light guides being joined, because reflection from the input end of the second light guide actually provides no idea about the accuracy of connection of the cores themselves, because the reflection factor of the sheath of a high quality low mode light guide differs very little from the reflection factor of the cores. Therefore, in determining losses caused by the non-coaxial alignment of the cores, it is essential to send radiation into the light guide being attached and then determine losses due to non-coaxial alignment.

To determine real losses due to non-coaxial alignment, the light guides 4 and 5 being joined are centered, a pulse (pulses) of radiation from the source 1 is sent into the light guide 5 (view b in the drawing), the sampling interval of the receiver 3 is changed so as to record only pulses reflected from the output end of the light guide 5, and the energy or total power $N_{3i}$ of the reflected pulses is measured, provided said end is ideally finished as its ideal condition is monitored, for example, visually with the help of a microscope.

$$N_{31} = \text{const} \cdot \tag{6}$$

$$\tau_{1,2}\tau_{2,3}(1-\rho)^2 \exp(-2\mu_4 l_4) \left[\frac{(1+\rho)^2}{1-\rho^2}\right]^2 \exp(-2\mu_5 l_5)\rho_i =$$

$$\text{const} \cdot \tau_{1,2}\tau_{2,3}(1-\rho)^2 \left(\frac{1-\rho}{1+\rho}\right)^2 \exp(-2\mu_4 l_4 - 2\mu_5 l_5)\rho_i,$$

wherein $(1-\rho)/(1+\rho)^2$ is a squared transmission factor of the air gap between the joined light guides, and $\rho_i$ is the reflection factor of the ideally finished output end.

By analogy with the determination of deviations in $\Delta N_1/N_1$, it follows from the formula (6) that the value of $N_3$ depends strongly on changes in $\Delta \rho/\rho$ of the condition of the output end of the second light guide and only little on the conditions of the other ends and the air gap. Since, however, the formula (6) is derived on the assumption that all the radiation emerging from the first light guide enters fully the second light guide and vice versa, because of the geometric matching of their cores, a mismatch (misalignment) of the cores causes the formula (6) to be transformed into:

$$N_{3i} = \text{const} \cdot \tag{7}$$

$$\tau_{1,2}\tau_{2,3}(1-\rho)^2 \left(\frac{1-\rho}{1+\rho}\right)^2 (1-K_n)^2 \exp(-2\mu_4 l_4 - 2\mu_5 l_5)\rho_i,$$

wherein $K_n$ designates optical losses due to non-coaxial alignment because of the geometric mismatch of the light guide cores. Obviously, unlike the formula (7), a mismatch of the light guide core does not cause an appreciable change in the formula (3), because the reflection factor of the sheath occupying the position of the core should the latter be offset may differ only slightly from the reflection factor of the core.

Therefore, in accordance with the formulae (6) and (7), the signal $N_3$ is most sensitive to the condition of the output end of the second light guide and the mismatch of the light guide cores.

After losses due to non-coaxial alignment have been determined, the output end of the second light guide is treated and, without disturbing the connection, the energy (total power) $N_3$ of pulses reflected from the realistically finished output end of the second light guide at a factor $\rho$ is measured:

$$N_3 = \tag{8}$$

$$\text{const } \tau_{1,2}\tau_{2,3}(1-\rho)^2 \left(\frac{1-\rho}{1+\rho}\right)^2 (1-K_n)\exp(-2\mu_4 l_4 - 2\mu_5 l_5)\rho$$

The losses $K_3$ at the output end of the second light guide are determined in dB from the formulae (7) and (8) $N_3/N_4 - \rho/\rho_i$:

$$K_3 = 10\log(N_{3i}/N_3) \tag{9}$$

Since all the kinds of losses at the ends and in the joint of the test light guides have been determined separately in the course of the above operations, the total losses $K_{\Sigma T}$ at the ends of the light guides and $K_{\Sigma s}$ in the joint can be assessed. Losses at the ends are found from the formula:

$$K_{\Sigma T} = K_1 + K_2 + K_3 \tag{10}$$

and in the joint, from the formula:

$$K_{\Sigma s} = K_{//} + K_n \tag{11}$$

Figure 2A:
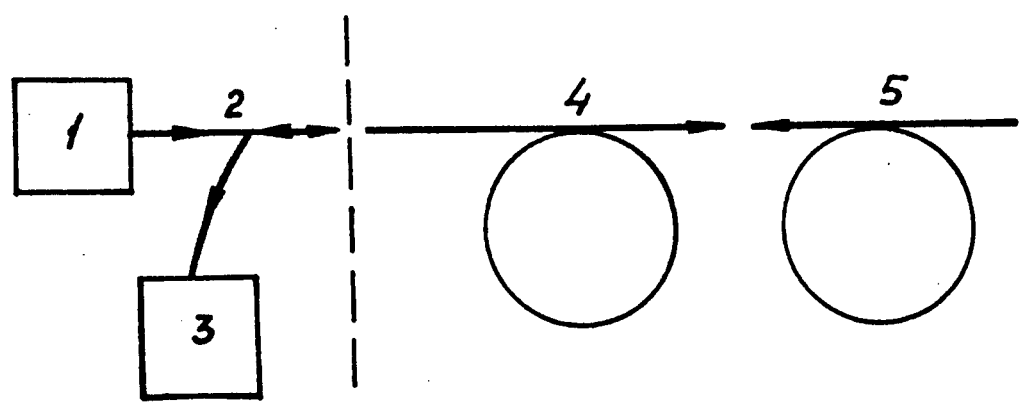
FIG. 2 shows a device for performing the method of measuring losses at the end joints of joined light guides.
Figure 2B:
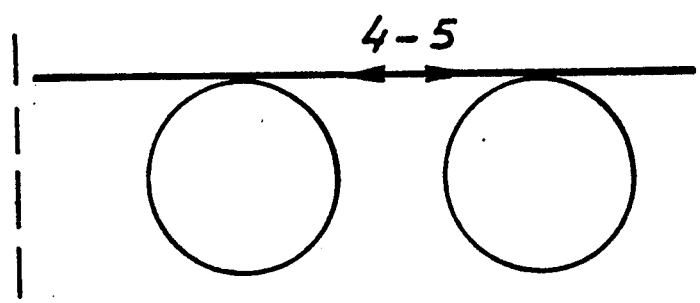

To determine optical losses in the end face joints of the fiber light guides, a radiation pulse (pulses) from the source 1 is sent successively through the splitter 2 into the first light guide 4 and the second light guide 5 being connected. After the cores of the light guides have been joined with the help of any adjusting device so that they are coaxial with each other and with the splitter, and the air gaps are minimal and do not disturb the stationary mode distribution of the probing radiation, the receiver 3 measures the power or energy of the pulse reflected from the output end of the second light guide 5 (view a in FIG. 2). The receiver signal $N_1'$ is in this case equal to:

$$N_1' = K\Phi_n\tau_{1,2}\tau_{2,4}^2\exp(-2\mu_n l_n)\tau_{4,5}^2\exp(-2\mu_5 l_5)\rho\tau_{2,5} = \tag{12}$$

$$K\Phi_n\tau_{1,2}\tau_{2,3}\tau_{2,4}^2\tau_{4,5}^2\exp(-2\mu_n l_n)\exp(-2\mu_5 l_5)\rho$$

wherein K is the proportionality factor;
$\Phi_n$ is the radiation flux or energy of the source 1;
$\tau_{1,2}$; $\tau_{2,3}$ are transmission factors of the light flux from the source to the splitter and from the splitter to the receiver;
$\tau_{2,4}$; $\tau_{4,5}$ are transmission factors of the air gap between the splitter 2 and the first light guide 4 and between the two light guides 4 and 5 being joined, and
$\mu_4$; $\mu_5$; $l_4$; $l_5$ are attenuation factors and lengths of the light guides 4 and 5.

After the light guides 4 and 5 have been connected without an air gap, the energy or maximum power of the pulse reflected from the output end of the now integral light guide 4–5 (view b) is measured. In this case, the signal $N_2'$ of the receiver 3 is equal to:

$$N_2' = K\Phi_n \cdot \tau_{1,2}\tau_{2,3}\tau_{2,4}^2\exp(-2\mu_4 l_4)K^2\exp(-2\mu_5 l_5)\rho = \tag{13}$$

$$K\Phi_n\tau_{1,2}\tau_{2,3}\tau_{2,4}^2 K^2\rho\exp(-2\mu_4 l_4)\exp(-2\mu_5 l_5)$$

and the ratio of the signals is:

$$\frac{N_2'}{N_1'} = \frac{K_2}{\tau_{4,5}} \tag{14}$$

Since, in accordance with Fresnel formulae, in view of multiple reflections, the transmission factor $\tau_{4,5}$ of the air gap between the joined light guides is equal to:

$$\tau = (1-\rho)^2 \frac{1}{1-\rho^2} = \frac{1-\rho}{1+\rho} = \frac{2n}{n^2+1} \qquad (15)$$

wherein $\rho$ is the reflection factor of the end, n is the refraction index, the formula (14) can be transformed to:

$$K = \frac{2n}{n^2+1} \sqrt{\frac{N_2'}{N_1'}} \qquad (16)$$

The final optical losses at the connecting point of the light guides, expressed in decibels, are determined from the formula:

$$K = 10\log 2n - 10\log(n^2+1) + 5\log N_2' - 5N_1' \qquad (17)$$

Since the refraction index of the light guides is known or can be determined with an accuracy of at least $\Delta n = \pm(1.10^{-3}$ to $1.10^{-4})$, the indefinite value of the reflection factor of the end of the light guide made of an extra pure quartz glass does not exceed $\Delta \rho \leq \pm 0.0025 \times 0.00347718 \leq \pm 1.10^{-4}$, and the value of $\Delta \tau / \tau \leq \pm 2.10^{-4}$, i.e., a change in the transmission factor of one end compared to the computed value does not exceed $\pm 0.001$ dB and $\Delta \tau / \tau$ of the air gap $\leq \pm 0.001$ dB. Therefore, the accuracy of measurements according to the formula (7), with the known values of the refraction index substituted therein, is considerably higher than the accuracy achieved in measurements according to the prototype with the help of reflectometers in scattered light and equal to $\pm 0.01$ dB even for the most precise instruments.

Therefore, the present method of measuring losses in fiber light guides in reflected light makes it possible to determine, with the highest attainable sensitivity, the finish quality and parallel alignment of the end faces, the coaxial relationship and optical losses in the area where the fiber light guides are joined at an air gap.

Moreover, these measurements help determine not only losses at the joint of light guides connected at an air gap, but also minimum possible losses during subsequent splicing of the light guides, because losses in the ends characterize losses through defects in shear surfaces, absorbing films, etc., which are not detected by other measurements (ref. analysis of relative sensitivities in passing and reflected lights). Similarly, the possibility of losses being determined at the output end presupposes the possibility of losses being determined at any successive joint of the second light guide with the third, or with the first, when their mutual position is changed.

An advantage of the measurement method described herein lies not only in that it expands the dynamic range of measurements and enhances their accuracy by carrying out measurements, not in scattered radiation but in a significantly more intensive radiation, but also in that it simplifies and accelerates considerably the cycle of optical loss measurements at the joint compared to the multi-point method used in optical reflectometry, which comprises, first, measuring the scattering factor in the first light guide, then in the second light guide, then measuring the distance to the joint, and when it is possible, after all these procedures, to determine with sufficient accuracy the losses in the joint or splice. Accordingly, the possibility of changes in the signal at the splicing point being monitored during measurements according to the present method allows reflected signals to be measured, while the possibility of losses at the test splicing point being determined quantitatively is ensured by the combination of measurement steps described hereinabove.

We claim:

1. A method of determining optical losses at ends and end joints of fiber light guides, comprising successively sending a probing light pulse into the fiber light guides being joined and subsequently determining optical losses at the joints of the fiber light guides, wherein, in order to expand the range of applications by allowing a finish quality of the ends, and their parallel and coaxial alignment to be determined, the method comprises measuring energy or total power $N_1$ of pulses reflected from an output end of a first test light guide, determining losses $K_1 = 10\log (N_{1max}/N_1)$ at the output end of the first light guide from a difference between the value of $N_1$ and a maximum $N_{1max}$, measuring energy or total power $N_2$ of pulses reflected from the end of the first light guide and an end of a second light guide connected at a test airgap, determining losses $K_2 = 10\log (N_{2max}/N_2) - K_1$ at an input end of the second light guide from a difference between the value of $N_2$ and a maximum $N_{2max}$ and between $N_1$ and $N_{1max}$, determining losses $K_{//} = 10\log$ due to alignment of the joined ends from a difference between a ratio $N_2/N_1$ and a maximum:

$$\left(\frac{N_2}{N_1}\right)_{max} = \frac{(n+1)^2}{n^2+1},$$

wherein n is the group refraction index of cores of the light guides, measuring energy or total power $N_{3i}$ of pulses which have passed through the test joint and been reflected by an ideally finished output end of the second light guide, determining losses $K_n = 10\log(N_{3max}/N_{3i})$ due to non-coaxial configuration of the joint from a difference between the value of $N_{3i}$ and maximum $N_{3max}$, measuring energy or total power $N_3$ of pulses reflected from the output end of the second test light guide, determining losses $K_3 = 10\log(N_{3i}/N_3)$ at the output end of the second light guide from a difference between the values of $N_3$ and $N_{3i}$, evaluating total losses $K_{\Sigma s}$ in the test joint of the light guides from the formula:

$$K_{\Sigma s} = K_{//} + K_n,$$

and measuring total losses $K_{\Sigma T}$ at all the three test ends of the light guides from the formula:

$$K_{\Sigma T} = K_1 + K_2 + K_3.$$

2. A method of determining optical losses at the ends and end joints of fiber light guides according to claim 1, wherein, in order to improve resolution by increasing distance to the test end joint, the method further comprises the steps of measuring energy or power N1, of a pulse which has passed through the ends of the light guides joined at a minimum gap, has been reflected from the output end of the second light guide and returned to the input end of the first light guide, joining the first and second light guides, measuring energy or power $N_2'$ of a pulse which has passed through the joint and has been reflected from the output end of the resulting integral light guide, and determining optical losses K at the joint from the formula:

$$K[dB] = 10\log 2n - \log(n^2+1) + 5\log N_2' - 5\log N_1',$$

wherein n is the group refraction index of the cores of the light guides being joined.

* * * * *